(No Model.)

H. PALMER.
BEARING AND COUPLING FOR SCREW CONVEYER SHAFTS.

No. 256,728. Patented Apr. 18, 1882.

Witnesses:
James F. Tobins
Harry Drury

Inventor:
Henry Palmer
by his attorneys
Howson and Son

UNITED STATES PATENT OFFICE.

HENRY PALMER, OF CHESTER, PENNSYLVANIA.

BEARING AND COUPLING FOR SCREW-CONVEYER SHAFTS.

SPECIFICATION forming part of Letters Patent No. 256,728, dated April 18, 1882.

Application filed March 13, 1882. (No model.)

*To all whom it may concern:*

Be it known that I, HENRY PALMER, a citizen of the United States, and a resident of Chester, Delaware county, Pennsylvania, have invented an Improvement in Bearings and Couplings for Screw-Conveyer Shafts, of which the following is a specification.

My invention consists of certain improvements, fully described hereinafter, in the bearings and couplings of screw-conveyer shafts which are provided with spiral flanges for traversing grain and other material along channels; and the object of my invention is to provide lengthened bearings for shafts of this class where sections are coupled together, and at the same time to bring the sections and their spiral flanges so near to each other that there can be no material interruption of the continuous action of the said spiral flanges.

Figure 1:
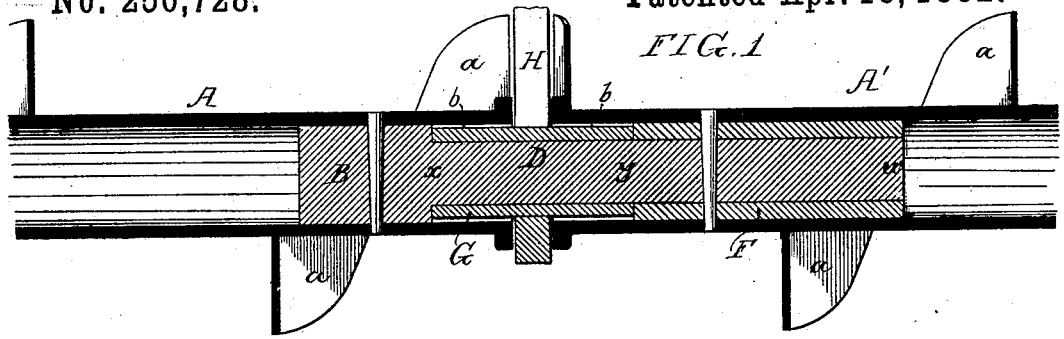
Figure 2:
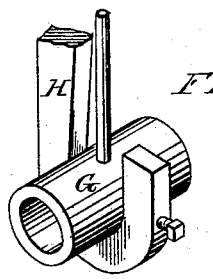
Figure 3:
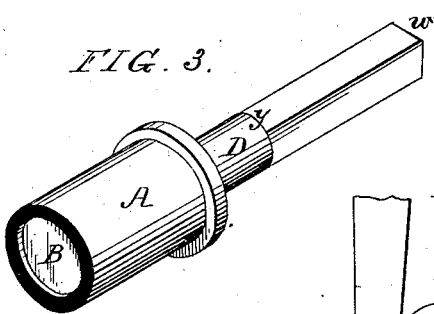
Figure 4:
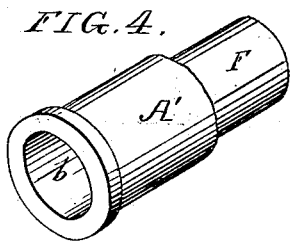
Figures 5, 6:
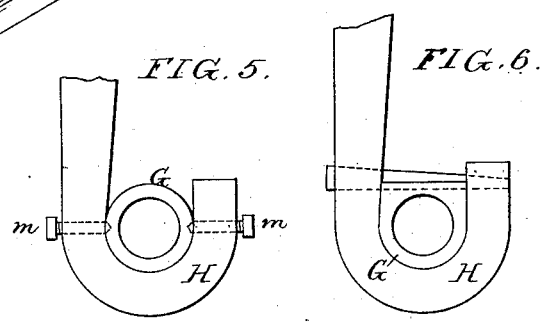

In the accompanying drawings, Figure 1 is a longitudinal section of my improved bearing and coupling for screw-conveyers; Figs. 2, 3, and 4, perspective views of the parts shown in Fig. 1 detached from each other; Fig. 5, a side view of the hanger and end view of the bearing; and Figs. 6, 7, and 8, modifications of my invention.

In Figs. 1, 2, 3, and 4, A and A' are the adjoining end portions of two sections of a screw-conveyer shaft, each section being tubular and provided with the usual spiral conveyer-flange, *a*.

To the section A, near the end of the same, is secured an internal cylindrical block, B, and from the latter projects the coupling-bar D, the portion of which from *x* to *y* is the journal, that from *y* to *w* (which is preferably square) fitting into an internal sleeve, F, secured to the section A'. The block B and sleeve F are secured in the tubular shafts A A' at some distance from the ends of the latter, so that each shaft has at the end an annular recess, *b*, surrounding the coupling-bar D, and adapted for the reception of the bearing G, which receives the journal portion of said coupling-bar, and consists of a short tube held by a hooked hanger or bracket, H, the latter being secured to any fixed object near the trough or channel in which the screw-conveyers are contained, and in which they traverse the grain or other material.

The hanger or bracket is preferably made of wrought-iron, and as thin as possible consistent with appropriate strength, so that the distance between the end of one section and that of the adjoining section may be as small as possible, for the nearer the sections are together the less will be the interruption of the continuity of the spiral conveyer-flanges.

The gap between the end of the spiral flange *a* of one section and the beginning of the spiral flange of the adjoining section will, in the full-sized device, be about three-quarters of an inch, and this narrow gap in the continuity of the flanges of the conveyer will not interfere with its proper action; but, although the sections of the conveyer-shaft are at such a short distance apart, the bearing for the two sections is of the same length as an ordinary bearing in proportion to the diameter of the journal, and not of the contracted character which is a serious objection to the ordinary bearings of conveyer-shafts. This lengthened bearing is obtained by extending one portion into the recessed end of one section and another portion into the recessed end of the other section. Care should be taken, however, that the internal diameter of the recess in the end of each section shall be greater than the external diameter of the bearing, so that the circumference of the bearing shall not be in contact with either of the sections; and care should also be taken that the ends of the two sections shall be clear of the bracket or hanger H, to which the bearing is preferably connected in the manner shown in Fig. 5—that is, by two set-screws, *m m*.

The coupling-bar D may, if desired, be a plain shaft fitted to adjoining sections of a solid shaft, as shown in Fig. 6, and serving to couple the sections together, the bar being secured to the sections by pins, keys, or other appliances; but the ends of the sections must be recessed for receiving portions of the long bearing, as described above.

Figures 7, 8:
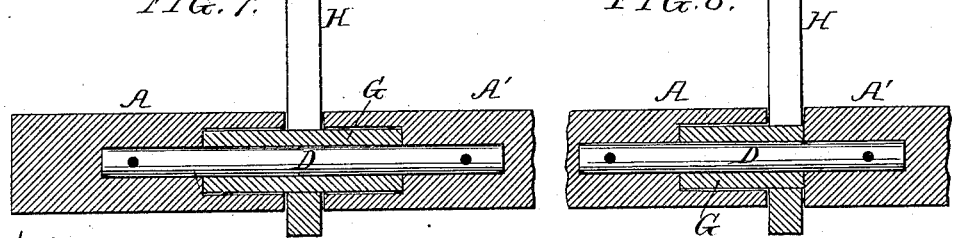

A comparatively long bearing may be made by recessing the end of one section only of the conveyer-shaft, as shown in Fig. 7, in which case the bearing must be attached at one end to the hanger, for which purpose a taper key may be used, as shown in Fig. 8.

To facilitate oiling, the bearing G may have an upwardly-projecting tube—such, for instance, as shown in Fig. 2.

I claim as my invention—

The combination of two sections of a conveyer-shaft and a journal-bar, D, adapted to couple the same together, with a tubular bearing, G, extending into one or both of the shafts, and a bracket or hanger for carrying the said bearing, all substantially as set forth.

In testimony whereof I have signed my name to this specification in the presence of two subscribing witnesses.

HENRY PALMER.

Witnesses:
HARRY DRURY,
HARRY SMITH.